B. M. HOTCHKISS.
MACHINE FOR MAKING TUBES AND STRIPS OF INDIA RUBBER.
No. 105,335.          Patented July 12, 1870.
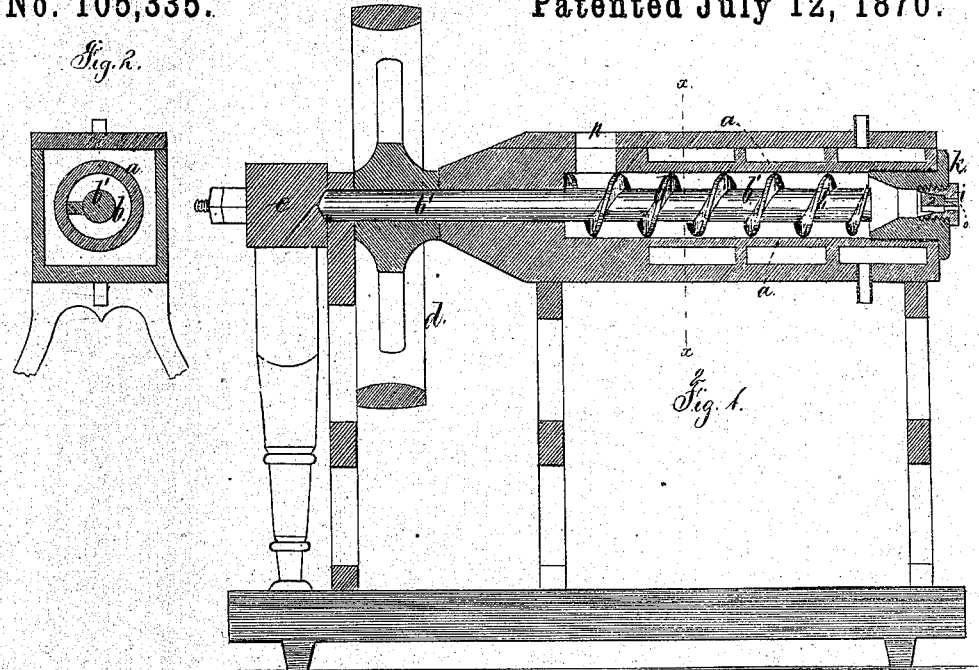
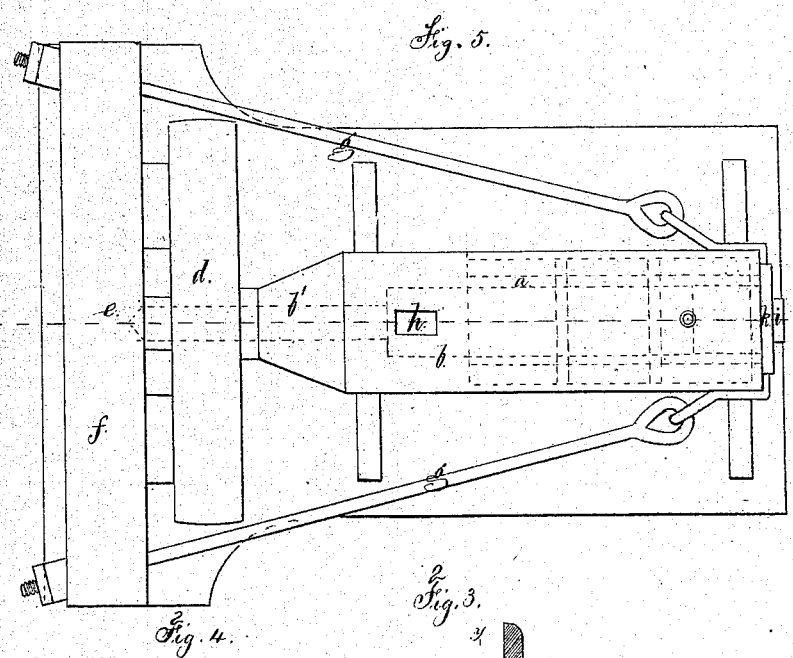
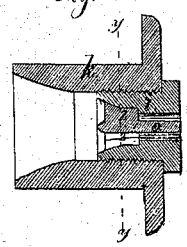

United States Patent Office.

BURRITT M. HOTCHKISS, OF NAUGATUCK, CONNECTICUT, ASSIGNOR TO GOODYEAR'S INDIA-RUBBER GLOVE MANUFACTURING COMPANY, OF SAME PLACE.

Letters Patent No. 105,335, dated July 12, 1870.

IMPROVEMENT IN MACHINES FOR MAKING TUBES AND STRIPS OF INDIA RUBBER.

The Schedule referred to in these Letters Patent and making part of the same.

*To all whom it may concern:*

Be it known that I, BURRITT M. HOTCHKISS, of Naugatuck, in the county of New Haven and State of Connecticut, have invented and made an Improvement in Machinery for Making Tubes and Strips of India Rubber, and the following is declared to be a correct description thereof.

In Letters Patent No. 37,112, granted December 9, 1862, a machine is described for making hose or covering telegraph-wire. In this machine difficulty is experienced from the India rubber being forced out, in the form of a thin sheet, at the joint between the halves of the cylinder containing the screw. Besides this, when the cylinder becomes obstructed, as is frequently the case, considerable time is lost in taking the cylinder apart, and the great end pressure to which the revolving screw is subjected, as it forces along the India rubber, causes the end bearings to be rapidly worn out.

My invention is an improvement upon the aforesaid machine, and consists in a cylindrical case and removable end cap, in combination with a feeding-screw having an end bearing, and removable endwise, so that there will not be any joint in the cylinder through which the rubber can be forced. The screw is supported against the endwise thrust, and can be taken out with facility for cleaning or the removal of obstructions.

I also make use of a die, formed with a corrugated interior surface, so as to give to the rubber a beaded appearance upon its surface, which greatly improves the looks.

I also use a removable die and changeable core, so as to make tubes or strips of any desired size or sectional shape.

In the drawing—

Figure 1 is a longitudinal section of my said machine;

Figure 2 is a cross-section at the line *x x*;

Figure 3 is a section, in larger size, of the die and core separately; and

Figure 4 is a cross-section of the same at the line *y y*.

Figure 5 is a plan of the machine.

The cylinder *a* is made of one piece of metal, bored out to receive the screw *b*, and around the cylinder *a* is a jacket or box, by means of which the cylinder *a* may be heated by steam or otherwise.

The screw *b* is entered endwise into the cylinder *a*, and its shaft, *b'*, at the rear end, passes through the driving-wheel or pulley *d*, and rests in a socket, *e*, that is in or upon a cross-frame, *f*, connected by the braces or slings *g* to the cylinder *a*.

The shaft *b'* of the screw *b* is connected by a screw or key to the wheel *d*, so as to be removable endwise, with facility from the cylinder and wheel, and the socket *e* takes the endwise pressure in a manner similar to the center of a lathe-mandrel.

The India rubber is supplied at the opening *h*, in pieces of a convenient size, and is pressed forward while in the groove of the screw by the rotation of said screw, so as to be forced out through the die in a strip or tube of the shape of said die.

The movable end cap *k* is screwed into the end of the cylinder *a*, and is adapted to receive the die *i*, which die *i* is screwed into the cap *k*, so as to be changed for making different articles, and the interior of said die is to be grooved with fine grooves, in order that a ribbed surface may be made upon the tube or strip.

The core, *o*, for making the interior of the pipe or tube, is formed with wings, 2 2, that cause the core to maintain a central position within the die, and the edges of the rubber, that come in contact within the die after passing these wings, are united by the pressure within the contracted opening that gives the final shape to the issuing strip or tube.

I claim as my invention—

1. The cylinder *a*, in combination with the screw *b*, wheel *d*, and bearing *e*, the parts being arranged as specified, so that the screw *b* can be removed endwise with facility, as set forth.

2. The removable cap *k* and die *i*, in combination with the screw *b*, cylinder *a*, and core *o*, as and for the purposes specified.

3. The die *i*, formed with a grooved interior surface, for imparting to the surface of the India rubber issuing from said die a ribbed appearance, as specified.

Signed by me this 26th day of January, A. D. 1870.

BURRITT M. HOTCHKISS.

Witnesses:
CHAS. H. SMITH,
GEO. T. PINCKNEY.